US012031699B1

(12) United States Patent
Song

(10) Patent No.: US 12,031,699 B1
(45) Date of Patent: Jul. 9, 2024

(54) RECESSED CEILING LAMP AND INDUCTOR PLUG THEREOF

(71) Applicant: JIANGSU EVER-TIE LIGHTING INC., Nantong (CN)

(72) Inventor: Qi Song, Nantong (CN)

(73) Assignee: JIANGSU EVER-TIE LIGHTING INC., Nantong (CN)

( * ) Notice: Subject to any disclaimer, the term of this patent is extended or adjusted under 35 U.S.C. 154(b) by 0 days.

(21) Appl. No.: 18/268,613

(22) PCT Filed: Nov. 11, 2022

(86) PCT No.: PCT/CN2022/131448

§ 371 (c)(1),
(2) Date: Jun. 21, 2023

(87) PCT Pub. No.: WO2023/165162

PCT Pub. Date: Sep. 7, 2023

(30) Foreign Application Priority Data

Mar. 4, 2022 (CN) ......................... 202220468166.6

(51) Int. Cl.
*F21V 17/16* (2006.01)
*F21S 8/02* (2006.01)
(Continued)

(52) U.S. Cl.
CPC ............ *F21V 15/015* (2013.01); *F21S 8/026* (2013.01); *F21V 17/12* (2013.01); *F21V 17/164* (2013.01);
(Continued)

(58) Field of Classification Search
CPC .... F21V 15/015; F21V 17/12; F21V 23/0442; F21S 8/026; F21Y 2115/10
See application file for complete search history.

(56) References Cited

U.S. PATENT DOCUMENTS

2018/0320873 A1* 11/2018 Veltri ...................... F21S 8/033

FOREIGN PATENT DOCUMENTS

CN 202691705 U 1/2013
CN 207213829 U 4/2018
(Continued)

OTHER PUBLICATIONS

English translation of Shou CN 108206353, published Jun. 2018 (Year: 2018).*
(Continued)

*Primary Examiner* — Evan P Dzierzynski
(74) *Attorney, Agent, or Firm* — Bayramoglu Law Offices LLC

(57) ABSTRACT

A recessed ceiling lamp and an inductor plug thereof belong to the technical field of lamps. The inductor plug includes a left end plate, an intermediate plate, and a right end plate. The intermediate plate is clamped between the left end plate and the right end plate, and integrally formed with the left end plate and the right end plate as an upside-down boat-shaped structure. An accommodating opening is formed in the intermediate plate. The left end plate is configured to be connected to a profile. The right end plate is configured to be docked with an end of a diffusing cover. An inductor to be mounted is connected to the intermediate plate through the accommodating opening.

17 Claims, 4 Drawing Sheets

(51) Int. Cl.
*F21V 15/015* (2006.01)
*F21V 17/12* (2006.01)
*F21V 23/04* (2006.01)
*F21Y 115/10* (2016.01)

(52) U.S. Cl.
CPC ....... *F21V 23/0442* (2013.01); *F21Y 2115/10* (2016.08)

(56) References Cited

FOREIGN PATENT DOCUMENTS

| | | | | |
|---|---|---|---|---|
| CN | 207378667 | U | * | 5/2018 |
| CN | 108206353 | A | * | 6/2018 |
| CN | 208886410 | U | | 5/2019 |
| CN | 210801081 | U | * | 6/2020 |
| CN | 210891212 | U | | 6/2020 |
| CN | 213840852 | U | | 7/2021 |
| CN | 217004199 | U | | 7/2022 |

OTHER PUBLICATIONS

English translation of Tan CN 207378667, published May 2018 (Year: 2018).*
English translation of Peng CN 210801081, published Jun. 2020 (Year: 2020).*

* cited by examiner

RECESSED CEILING LAMP AND INDUCTOR PLUG THEREOF

CROSS REFERENCE TO THE RELATED APPLICATIONS

This application is the national phase entry of International Application No. PCT/CN2022/131448, filed on Nov. 11, 2022, which is based upon and claims priority to Chinese Patent Application No. 202220468166.6, filed on Mar. 4, 2022, the entire contents of which are incorporated herein by reference.

TECHNICAL FIELD

The present disclosure relates to the technical field of lamps, and in particular to a recessed ceiling lamp and an inductor plug thereof.

BACKGROUND

With the development of light-emitting diode (LED) technologies, conventional LED lighting has been gradually transitioned to intelligent control, and incorporated into an Internet of things (IoT) system. However, in the development toward intelligent control, a lighting lamp will be more expensive with an inductor. Regarding whether the inductor is mounted on the lighting lamp, there have been two demands in markets, and at least two different production lines need to be provided by the manufacturers. In addition, for commercially available lamps such as office or home troffer lamps (recessed ceiling lamps) at present, the inductor is mounted cumbersomely.

The Chinese utility model patent No. CN213840852 U provides an inductor hidden lighting lamp, including a lamp body and an end cap component on an end of the lamp body. An accommodating cavity and an inductor are provided in the end cap component. The inductor is electrically connected to the lamp body. A telescopic elastic component is provided in the accommodating cavity. One end of the elastic component is fixedly connected to a probe of the inductor. In response to a compressed state of the elastic component, the probe of the inductor is pulled back to the accommodating cavity and is hidden. When an elastic force of the elastic component is released, the probe of the inductor can be pushed out of the accommodating cavity 1W and exposed out of the end cap component. According to the inductor hidden lighting lamp, through an inductor hiding structure, the inductor can be either hidden or exposed out for work, so that when the lamp is not used, dust is not accumulated on the probe of the inductor to affect the induction sensitivity. Nevertheless, the structural design is complex. The inductor is provided no matter whether it is used or not, thus raising the cost.

SUMMARY

In view of defects of the prior art, an objective of the present disclosure is to provide a recessed ceiling lamp and an inductor plug thereof.

An inductor plug for a recessed ceiling lamp provided by one or more embodiments of the present disclosure includes a left end plate, an intermediate plate, and a right end plate, where the intermediate plate is clamped between the left end plate and the right end plate, and integrally formed with the left end plate and the right end plate as an upside-down boat-shaped structure; and an accommodating opening is formed in the intermediate plate; and the left end plate is configured to be connected to a profile; the right end plate is configured to be docked with an end of a diffusing cover; and an inductor to be mounted is connected to the intermediate plate through the accommodating opening.

In some implementations, a clamping boss is formed by extending outward for a certain distance from an edge of the accommodating opening; and the inductor to be mounted is located on the clamping boss.

In some implementations, a notch is formed in a side edge of the accommodating opening; the inductor to be mounted is clamped onto the accommodating opening; and the notch is configured to form avoidance for a clamped fastener to facilitate detachment.

In some implementations, fastening threaded holes are formed in the left end plate; there are two sets of the fastening threaded holes; the two sets of the fastening threaded holes are arranged side by side; and each set of the fastening threaded holes includes two fastening threaded holes arranged up and down.

In some implementations, studs are provided on an inner side surface of the left end plate; the studs are respectively located on end surfaces of the fastening threaded holes; and ends of bolts are respectively located in the studs after the bolts pass through the fastening threaded holes.

In some implementations, a first clamping strip and a second clamping strip are provided on an outer side surface of the right end plate; the first clamping strip and the second clamping strip are arranged up and down to form a first clamping groove; and the first clamping groove is configured to clamp the diffusing cover to be docked.

In some implementations, two sides of the right end plate are respectively connected to limiting members; two ends of the first clamping strip respectively extend to the sides of the right end plate to form an upside-down concave shape; the two limiting members are respectively formed into second clamping grooves with the two ends of the first clamping strip; and the second clamping grooves are configured to clamp the diffusing cover to be docked.

In some implementations, the inductor plug further includes a cap; and the cap is detachably connected to the accommodating opening.

In some implementations, a bracket is provided on an inner surface of the cap, and the bracket is configured to support a power cord.

An embodiment of the present disclosure further provides a recessed ceiling lamp, using the inductor plug for a recessed ceiling lamp, and further including a support plate, an LED lamp, the diffusing cover, reflecting plates, and a driving case, where the support plate includes a left support plate and a right support plate; two reflecting plates are clamped between the left support plate and the right support plate to form a groove-shaped structural body; the diffusing cover is provided on a middle of the groove-shaped structural body; the LED lamp is shielded in the diffusing cover; the left end plate is firmly connected to the left support plate through a bolt; and one end of the diffusing cover is docked with the right end plate, and the other end of the diffusing cover is connected to the right support plate; and the accommodating opening is configured to mount the inductor or the cap.

BRIEF DESCRIPTION OF THE DRAWINGS

Other features, objectives, and advantages of the present disclosure will become more apparent by reading the detailed description of non-limiting embodiments with reference to the following drawings.

DETAILED DESCRIPTION OF THE EMBODIMENTS

The present disclosure is described in detail below with reference to specific embodiments. The following embodiments will help those skilled in the art further understand the present disclosure, but will not limit the present disclosure in any way. It should be noted that several variations and improvements can also be made by a person of ordinary skill in the art without departing from the conception of the present disclosure. These all fall within the protection scope of the present disclosure.

Embodiment 1

Figure 1:
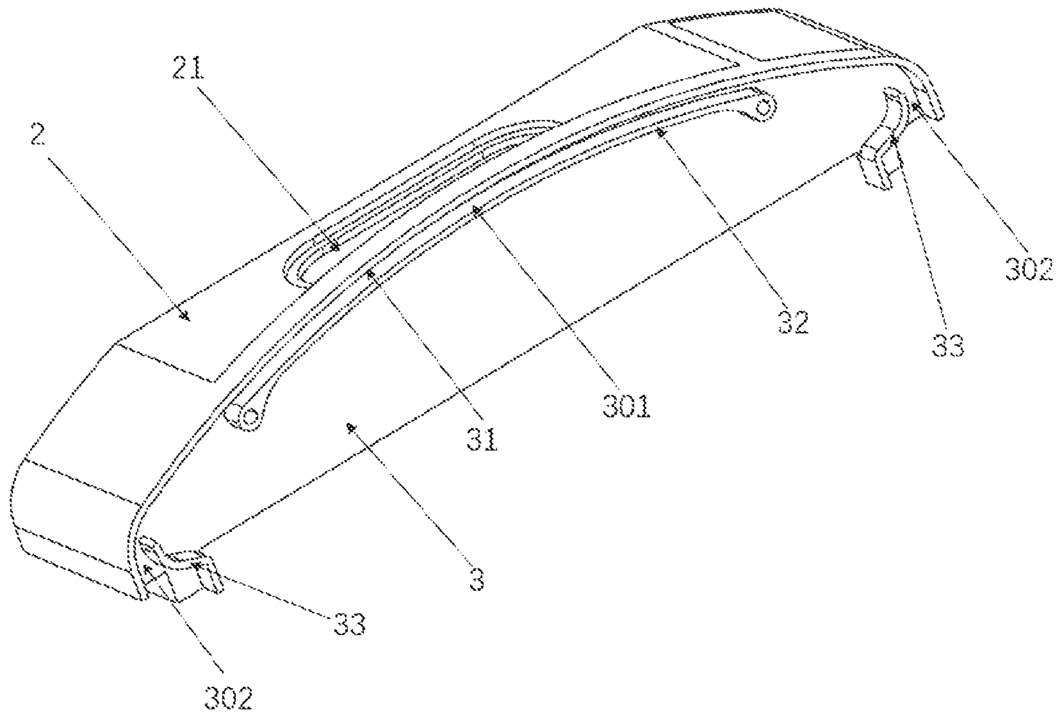
FIG. 1 is a right view of an inductor plug according to an embodiment of the present disclosure.
Figure 2:
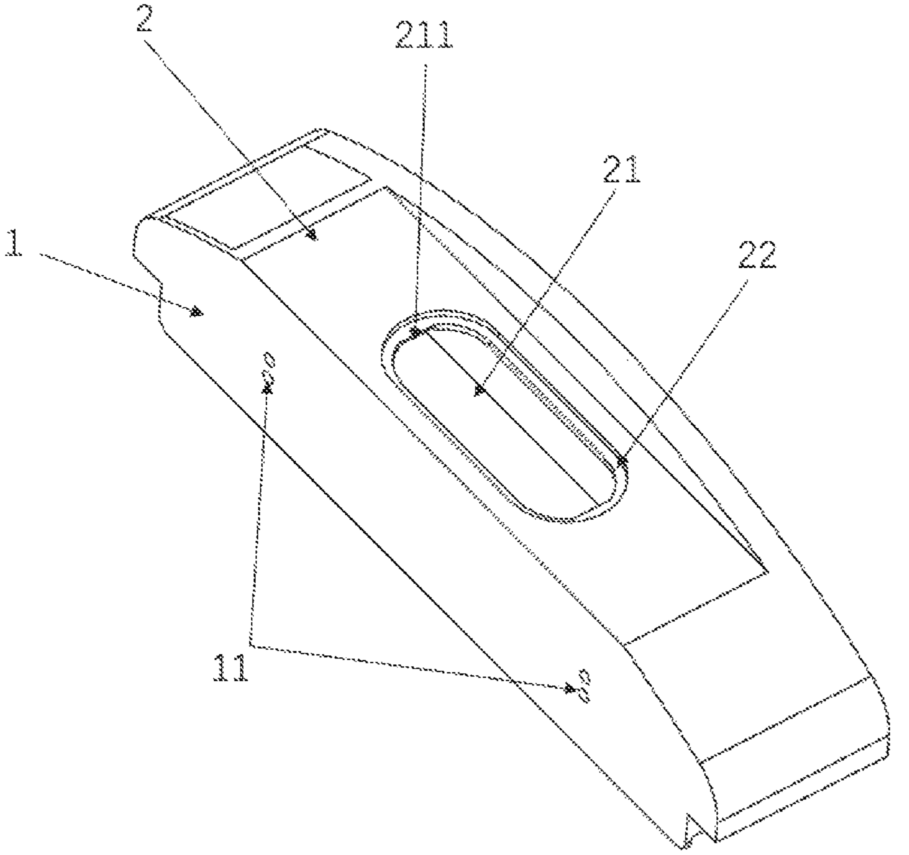
FIG. 2 is a left view of an inductor plug according to an embodiment of the present disclosure.
Figure 3:
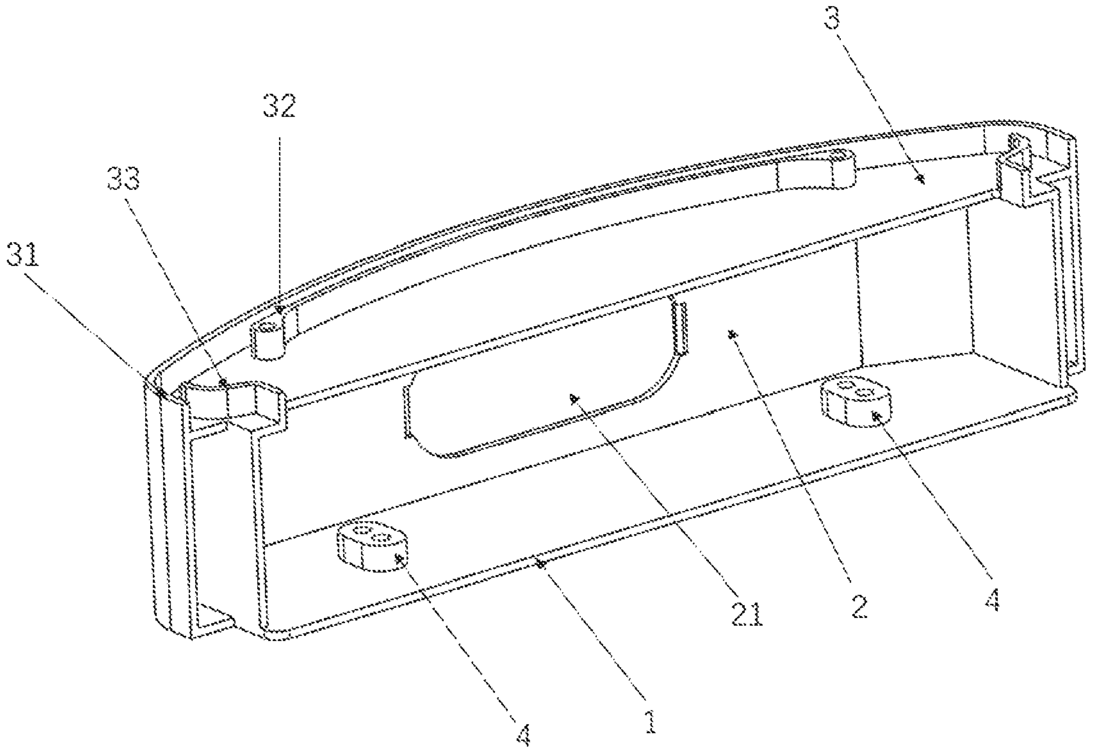
FIG. 3 is a bottom view of an inductor plug according to an embodiment of the present disclosure.
Figure 4:
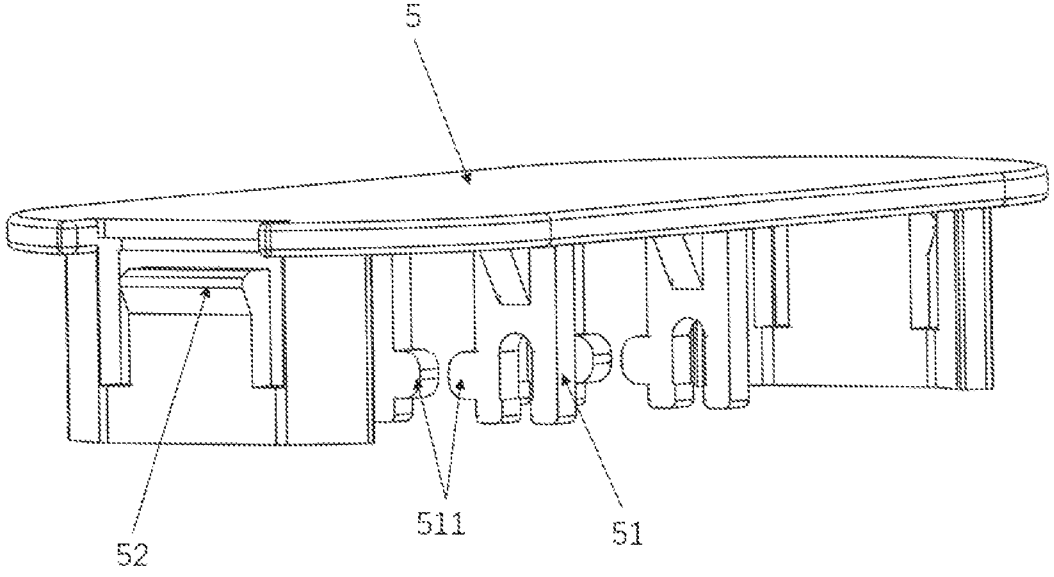
FIG. 4 is a structural schematic view of a cap according to an embodiment of the present disclosure.
Figure 5:
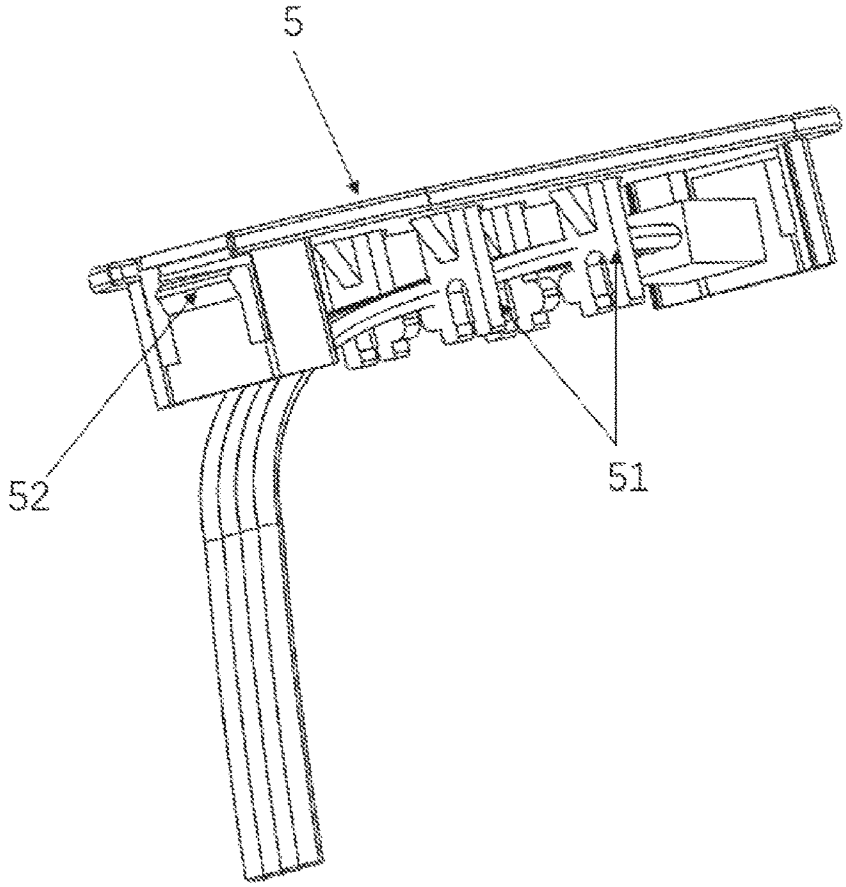
FIG. 5 is a structural schematic view of a cap supporting a power cord according to an embodiment of the present disclosure.
Figure 6:
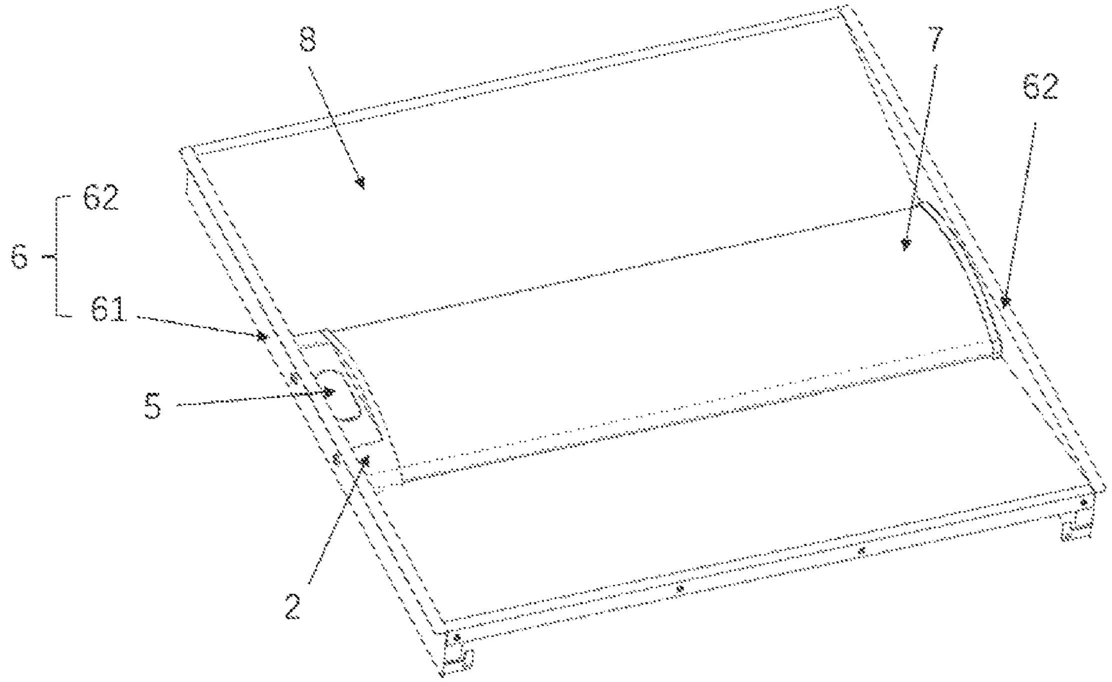
FIG. 6 is an overall schematic structural view of a recessed ceiling lamp according to an embodiment of the present disclosure.

An embodiment of the present disclosure provides an inductor plug for a recessed ceiling lamp. As shown in FIGS. 1-6, the inductor plug includes left end plate 1, intermediate plate 2, and right end plate 3. The left end plate 1 and the right end plate 3 are vertical plates, while the intermediate plate 2 is an arc plate. The intermediate plate 2 is clamped between the left end plate 1 and the right end plate 3, and integrally formed with the left end plate 1 and the right end plate 3 as the boat-shaped inductor plug. The inductor plug is mounted on the recessed ceiling lamp in an upside-down manner.

Accommodating opening 21 is formed in a top of the intermediate plate 2. The accommodating opening 21 is configured to mount inductor 100. A shape of the accommodating opening 21 is matched with a shape of a mounting seat of the inductor, and may be provided as a racetrack for example. Preferably, clamping boss 22 is formed by extending outward for a certain distance from an edge of the accommodating opening 21 and excavating a material. The mounting seat of the inductor 100 is located on the clamping boss 22. This makes the inductor 100 mounted more stably. Further, the inductor 100 is provided on the accommodating opening 21 in a clamping manner. The mounting seat of the inductor can be clamped onto the accommodating opening 21 through symmetrical fasteners. Notch 211 is formed in a side of the accommodating opening 21. The notch 211 is configured to form avoidance for one of the fasteners to facilitate detachment.

The left end plate 1 is firmly connected to a frame profile of the recessed ceiling lamp. Fastening threaded holes 11 are formed in the left end plate 1. There are two sets of the fastening threaded holes 11 that are arranged side by side. The two sets of the fastening threaded holes 11 in a transverse direction can improve firmness in connection. Preferably, each set of the fastening threaded holes 11 includes two fastening threaded holes arranged up and down. The up-and-down arrangement can facilitate adjustment on a relative height of the inductor plug connected to the frame profile, and can be adapted to diffusing covers with different sizes. Further, studs 4 are provided on an inner side surface of the left end plate 1. The studs 4 are respectively located on end surfaces of the fastening threaded holes 11. Through holes or counterbores are respectively formed in the studs 4. The through holes or the counterbores are respectively coaxial with the fastening threaded holes 11. When the left end plate 1 is firmly connected to the frame profile through bolts, ends of the bolts enter the through holes or the counterbores of the studs 4 after the bolts pass through the fastening threaded holes 11. This effectively prevents the extended ends of the bolts from affecting the inductor to be mounted or a power cord.

The right end plate 3 is docked with a diffusing cover, namely one end of the arc-shaped diffusing cover is docked on an outer surface of the right end plate 3. Preferably, first clamping strip 31 and second clamping strip 32 are provided on an outer side surface of the right end plate 3. The first clamping strip 31 and the second clamping strip 32 each are arc-shaped. The arc-shaped first clamping strip 31 and the arc-shaped second clamping strip 32 are arranged up and down along a plate surface of the right end plate 3 to form a first clamping groove 301. An upper portion of the end of the diffusing cover is clamped into the first clamping groove 301. This makes the diffusing cover and the inductor plug more stable relatively. Further, two ends of the first clamping strip 31 respectively extend downward to sides of the right end plate 3 to form a concave shape. Limiting members 33 are respectively provided at two sides of the right end plate 3. The limiting members 33 each are seat-shaped. The two limiting members 33 are respectively formed into second clamping grooves 302 with the two ends of the first clamping strip 31. The end of the diffusing cover is docked with the right end plate 3, with the upper portion clamped into the first clamping groove 301, and two sides respectively clamped into the second clamping grooves 302. This further makes the connection more stable.

The inductor is mounted through the inductor plug, such that whether the inductor is mounted can be determined according to requirements of users, and differences between production processes caused by different mounting requirements on the inductor can be eliminated. The present disclosure not only makes the lamp more practical, but also can reduce a production cost in mass production.

Embodiment 2

Embodiment 2 is realized on the basis of Embodiment 1. By providing a cap matched with the inductor plug, the lamp is more aesthetically-pleasing when the inductor is provided unnecessarily. Meanwhile, by optimizing a structure of the cap, a power cord in the inductor plug is put in order. Specifically:

As shown in FIGS. 1-6, a cap 5 is provided on the inductor plug. The cap 5 covers the accommodating opening 21. A shape of the cap 5 is matched with a shape of the intermediate plate 2. In other words, the cap 5 covering the accommodating opening 21 can be integrally formed with the intermediate plate 2 to make the lamp more aesthetically-pleasing. Preferably, while the cap 5 is provided with a structure matched with the clamping boss 22, fasteners 52 are respectively provided at two ends of the cap 5. The cap is clamped onto the accommodating opening 21 through the fasteners 52. Therefore, when the inductor needs to be mounted, the cap is detached conveniently.

Further, bracket 51 is arranged on an inner surface of the cap 5. The bracket 51 is preferably a plate body with a middle U-shaped groove. Spherical protrusion 511 is provided at one side of the plate body. Two brackets 51 are spaced apart and arranged side by side, while two spherical protrusions 511 are opposite to each other without contact. The power cord located in the inductor plug and connected to the inductor passes through a space between the two brackets 51 and is supported on the two spherical protrusions. Preferably, there are multiple sets of the brackets 51. In each set, there are two brackets that are arranged side by side. The multiple sets of the brackets 51 are formed into a channel where the power cord gets in and out and is supported by the spherical protrusions 511.

Embodiment 3

Figure 7:
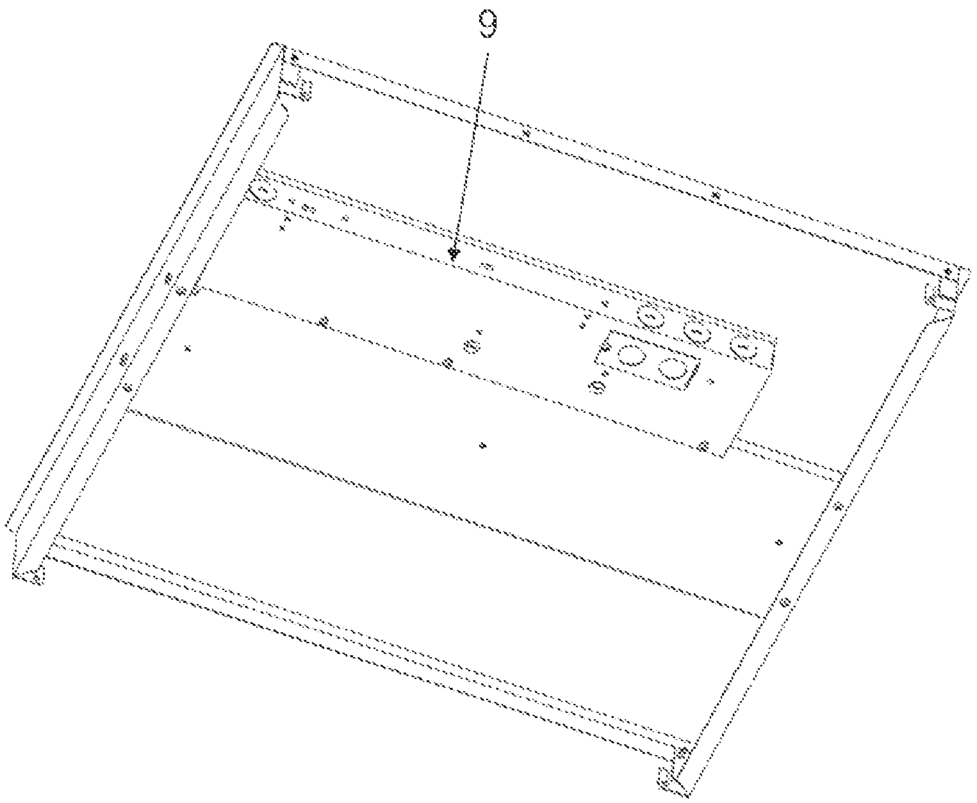
FIG. 7 is a schematic structural view of a bottom side of a recessed ceiling lamp according to an embodiment of the present disclosure.
Figure 8:
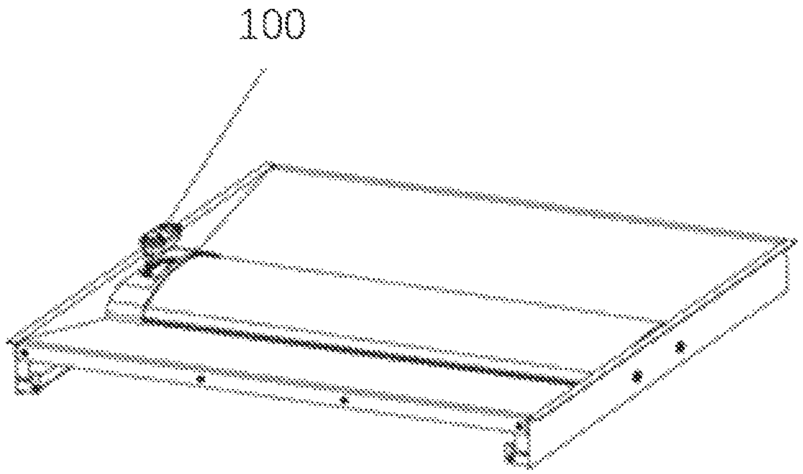
FIG. 8 is a schematic structural view of a recessed ceiling lamp with an inductor according to an embodiment of the present disclosure.

According to Embodiment 3, on the basis of Embodiment 1 or Embodiment 2, a recessed ceiling lamp is provided. As shown in FIGS. 1-8, the recessed ceiling lamp uses the inductor plug for a recessed ceiling lamp in Embodiment 1 or Embodiment 2, and further includes support plate 6, LED lamp, diffusing cover 7, reflecting plates 8, and driving case 9.

The support plate 6 includes left support plate 61 and right support plate 62. Two reflecting plates 8 are clamped the left support plate 61 and the right support plate 62 to form a concave groove-shaped structural body. The diffusing cover 7 is provided on a middle of the groove-shaped structural body. The LED lamp is shielded in the diffusing cover 7. The LED lamp may be a strip structure. The left end plate 1 is firmly connected to the left support plate 61 through a bolt. A left end of the diffusing cover 7 is docked with the right end plate 3 and sleeved to the first clamping groove 301 and the second clamping grooves 302, and a right end of the diffusing cover 7 is connected to the right support plate 62. The driving case 9 is provided on the reflecting plates 8. The driving case 9 is configured to store a drive component.

When the inductor is mounted, the inductor is provided on the inductor plug through the accommodating opening 21. When the inductor is mounted unnecessarily, the cap 5 is clamped onto the accommodating opening 21.

In the description of the present application, it needs to be understood the orientation or positional relationships indicated by terms, such as "up", "down", "front", "rear", "left", "right", "vertical", "horizontal", "top", "bottom", "inside", and "outside", are based on the orientation or positional relationship shown in the drawings, are merely for facilitating the description of the present application and simplifying the description, rather than indicating or implying that an apparatus or element referred to must have a particular orientation or be constructed and operated in a particular orientation, and therefore will not be interpreted as limiting the present application.

Compared with the prior art, the present disclosure has following beneficial effects:

1. The inductor is mounted through the inductor plug, such that whether the inductor is mounted can be determined according to requirements of users, and differences between production processes caused by different mounting requirements on the inductor can be eliminated. The present disclosure not only makes the lamp more practical, but also can reduce a production cost in mass production.
2. By providing a cap matched with the inductor plug, the lamp is more aesthetically-pleasing when the inductor is provided unnecessarily. Meanwhile, by optimizing a structure of the cap, a power cord in the inductor plug is put in order.
3. With a clamping groove structure on the right end plate docked with the diffusing cover, the present disclosure effectively makes the inductor plug and the diffusing cover more stable.

The specific examples of the present disclosure are described above. It should be understood that the present disclosure is not limited to the above specific implementations, and a person skilled in the art can make various variations or modifications within the scope of the claims without affecting the essence of the present disclosure. The examples of the present disclosure and features in the examples may be arbitrarily combined with each other in a non-conflicting situation.

What is claimed is:

1. An inductor plug for a recessed ceiling lamp, comprising a left end plate, an intermediate plate, and a right end plate, wherein the intermediate plate is clamped between the left end plate and the right end plate, and the intermediate plate is integrally formed with the left end plate and the right end plate as an upside-down boat-shaped structure; and an accommodating opening is formed in the intermediate plate; and the left end plate is configured to be connected to a profile; the right end plate is configured to be docked with an end of a diffusing cover; and an inductor to be mounted is connected to the intermediate plate through the accommodating opening.

2. The inductor plug for the recessed ceiling lamp according to claim 1, wherein a clamping boss is formed by extending outward for a certain distance from an edge of the accommodating opening; and the inductor to be mounted is located on the clamping boss.

3. The inductor plug for the recessed ceiling lamp according to claim 2, further comprising a cap, wherein the cap is detachably connected to the accommodating opening.

4. The inductor plug for the recessed ceiling lamp according to claim 1, wherein a notch is formed in a side edge of the accommodating opening; the inductor to be mounted is clamped onto the accommodating opening; and the notch is configured to form avoidance for a clamped fastener to facilitate detachment.

5. The inductor plug for the recessed ceiling lamp according to claim 4, further comprising a cap, wherein the cap is detachably connected to the accommodating opening.

6. The inductor plug for the recessed ceiling lamp according to claim 1, wherein two sets of fastening threaded holes are formed in the left end plate; the two sets of the fastening threaded holes are arranged side by side; and each set of the two sets of the fastening threaded holes comprises two fastening threaded holes arranged up and down.

7. The inductor plug for the recessed ceiling lamp according to claim 6, wherein studs are provided on an inner side surface of the left end plate; the studs are respectively located on end surfaces of the two sets of the fastening threaded holes; and ends of bolts are respectively located in the studs after the bolts pass through the two sets of the fastening threaded holes.

8. The inductor plug for the recessed ceiling lamp according to claim 7, further comprising a cap, wherein the cap is detachably connected to the accommodating opening.

9. The inductor plug for the recessed ceiling lamp according to claim 6, further comprising a cap, wherein the cap is detachably connected to the accommodating opening.

10. The inductor plug for the recessed ceiling lamp according to claim 1, wherein a first clamping strip and a second clamping strip are provided on an outer side surface of the right end plate; the first clamping strip and the second clamping strip are arranged up and down to form a first clamping groove; and the first clamping groove is configured to clamp the diffusing cover to be docked.

11. The inductor plug for the recessed ceiling lamp according to claim 10, wherein two sides of the right end plate are respectively connected to two limiting members; two ends of the first clamping strip respectively extend to the two sides of the right end plate to form an upside-down concave shape; the two limiting members are respectively formed into second clamping grooves with the two ends of the first clamping strip; and the second clamping grooves are configured to clamp the diffusing cover to be docked.

12. The inductor plug for the recessed ceiling lamp according to claim 11, further comprising a cap, wherein the cap is detachably connected to the accommodating opening.

13. The inductor plug for the recessed ceiling lamp according to claim 10, further comprising a cap, wherein the cap is detachably connected to the accommodating opening.

14. The inductor plug for the recessed ceiling lamp according to claim 1, further comprising a cap, wherein the cap is detachably connected to the accommodating opening.

15. The inductor plug for the recessed ceiling lamp according to claim 14, wherein a bracket is provided on an inner surface of the cap, and the bracket is configured to support a power cord.

16. A recessed ceiling lamp, using the inductor plug for the recessed ceiling lamp according to claim 15, and further comprising a support plate, the diffusing cover, two reflecting plates, a driving case, and a light-emitting diode (LED) lamp, wherein the support plate comprises a left support plate and a right support plate; the two reflecting plates are clamped between the left support plate and the right support plate to form a groove-shaped structural body; the diffusing cover is provided on a middle of the groove-shaped structural body; the LED lamp is shielded in the diffusing cover; the left end plate is firmly connected to the left support plate through a bolt; and a first end of the diffusing cover is docked with the right end plate, and a second end of the diffusing cover is connected to the right support plate; and the accommodating opening is configured to mount the inductor or the cap.

17. A recessed ceiling lamp, using the inductor plug for the recessed ceiling lamp according to claim 14, and further comprising a support plate, the diffusing cover, two reflecting plates, a driving case, and a light-emitting diode (LED) lamp, wherein the support plate comprises a left support plate and a right support plate; the two reflecting plates are clamped between the left support plate and the right support plate to form a groove-shaped structural body; the diffusing cover is provided on a middle of the groove-shaped structural body; the LED lamp is shielded in the diffusing cover; the left end plate is firmly connected to the left support plate through a bolt; and a first end of the diffusing cover is docked with the right end plate, and a second end of the diffusing cover is connected to the right support plate; and the accommodating opening is configured to mount the inductor or the cap.

* * * * *